(12) United States Patent
Goetz et al.

(10) Patent No.: US 8,930,489 B2
(45) Date of Patent: Jan. 6, 2015

(54) DISTRIBUTED RATE LIMITING OF HANDLING REQUESTS

(75) Inventors: David Goetz, San Antonio, TX (US); Michael Barton, San Antonio, TX (US); Greg Lange, San Antonio, TX (US)

(73) Assignee: Rakspace US, Inc., San Antonio, TX (US)

( * ) Notice: Subject to any disclaimer, the term of this patent is extended or adjusted under 35 U.S.C. 154(b) by 408 days.

(21) Appl. No.: 13/270,380

(22) Filed: Oct. 11, 2011

(65) Prior Publication Data

US 2013/0091241 A1 Apr. 11, 2013

(51) Int. Cl.
| | |
|---|---|
| G06F 15/16 | (2006.01) |
| G06F 15/173 | (2006.01) |
| H04L 12/815 | (2013.01) |
| H04L 29/08 | (2006.01) |
| H04L 12/801 | (2013.01) |
| H04L 12/819 | (2013.01) |
| H04L 12/803 | (2013.01) |

(52) U.S. Cl.
CPC .............. *H04L 47/22* (2013.01); *H04L 67/322* (2013.01); *H04L 67/2819* (2013.01); *H04L 67/325* (2013.01); *H04L 67/1002* (2013.01); H04L 47/10 (2013.01); H04L 47/215 (2013.01); H04L 47/125 (2013.01)
USPC ............................. 709/217; 709/218; 709/224

(58) Field of Classification Search
CPC ..... H04L 47/10; H04L 67/1002; H04L 47/12; H04L 47/125; G06F 3/0647; G06F 3/067; G06F 3/0689
See application file for complete search history.

(56) References Cited

U.S. PATENT DOCUMENTS

| | | | | |
|---|---|---|---|---|
| 7,024,481 | B2 * | 4/2006 | Kaniyar et al. | 709/227 |
| 7,032,119 | B2 * | 4/2006 | Fung | 713/320 |
| 7,454,457 | B1 * | 11/2008 | Lowery et al. | 709/203 |
| 7,640,547 | B2 * | 12/2009 | Neiman et al. | 718/104 |
| 8,260,917 | B1 * | 9/2012 | Manikowski et al. | 709/225 |
| 2001/0049741 | A1 * | 12/2001 | Skene et al. | 709/232 |
| 2008/0259798 | A1 * | 10/2008 | Loh et al. | 370/235 |
| 2010/0211672 | A1 * | 8/2010 | Brown et al. | 709/224 |
| 2010/0274893 | A1 * | 10/2010 | Abdelal et al. | 709/224 |
| 2010/0333105 | A1 * | 12/2010 | Horvitz et al. | 718/105 |
| 2011/0208858 | A1 * | 8/2011 | Yancey et al. | 709/224 |
| 2011/0231582 | A1 * | 9/2011 | Uysal et al. | 710/15 |
| 2011/0239210 | A1 * | 9/2011 | Kotani et al. | 717/171 |
| 2011/0307889 | A1 * | 12/2011 | Moriki et al. | 718/1 |

* cited by examiner

*Primary Examiner* — Rupal Dharia
*Assistant Examiner* — Joe Chacko
(74) *Attorney, Agent, or Firm* — Trop, Pruner & Hu, P.C.

(57) ABSTRACT

In one embodiment, the present invention includes a method for performing rate limiting in a horizontally distributed and scalable manner. The method includes receiving a request in a rate limiter. In turn, a sleep time can be obtained for the request based at least in part on a time value and an allotted time per request, and the request can be delayed according to the sleep time. The time value can be obtained from a distributed key value store using a key generated from the request. After this sleep time, the request can be forwarded from the rate limiter to the handling server.

12 Claims, 3 Drawing Sheets

DISTRIBUTED RATE LIMITING OF HANDLING REQUESTS

BACKGROUND

In many computer networking environments, requests to be handled can be received from many different users at remote locations to handling devices. It is possible that the amount of incoming requests can exceed the bandwidth of the handling devices. As a result, requests can be handled in a less than optimal manner. For example, requests can take too long to be handled, or they may not be handled at all, as certain requests can be denied. A common strategy to solve this problem is to distribute the incoming requests to a number of servers, each with an independent ability to serve each request. However, it is still desirable to limit a single user from using more than his share of the system's resources. If the requests are distributed evenly to independent devices it can be difficult to gauge total impact on the system. Currently, there are not suitable rate limiting mechanisms to handle requests to such a distributed system without hindering the performance and/or scalability of the system itself.

SUMMARY OF THE INVENTION

According to one aspect, the present invention includes a method for performing rate limiting in a horizontally distributed and scalable manner. The method includes receiving a request in a rate limiter, where this request is received from a remote user associated with an account and is for an operation to be performed by a handling server. In turn, a sleep time can be obtained for the request based at least in part on a first time value and an allotted time per request, and the request can be delayed according to the sleep time. After this sleep time, the request can be forwarded from the rate limiter to the handling server. Such rate limiting can be for all incoming requests, or it can be limited only to requests of particular customers, e.g., of a data center such as a multi-tenant data center.

To realize the distributed rate limiting, embodiments can use a consistent hash ring to determine one of multiple key stores to access to obtain information associated with the account used to determine whether a sleep time is to be applied to a given request. More specifically, a rate limit key can be generated based on one or more attributes of the request and used to access the ring to determine the key store to access to obtain this information.

Another aspect is directed to a system that includes a router to receive incoming requests from a network, a load balancer coupled to the router to receive at least some of the incoming requests and provide them to servers each having a synchronized clock. In turn, a rate limiter, which may execute on these servers, can delay incoming requests associated with an account by a delay time period if a rate of the incoming requests exceeds a handling rate associated with the account. To aid in this determination a key store can store entries including a key and a running time associated with the key. The rate limiter may issue an atomic increment to update the running time of an entry and receive the running time to determine the delay time period.

Still further aspects are directed to a computer-readable storage medium that includes instructions to enable a distributed rate limiting system to be performed. The instructions can cause the system to receive requests in the rate limiter of a data center. For each of the requests, the rate limiter can generate a token based on attribute information of the request and send the token to a key value server to obtain time information used to determine a time at which to handle the request. Then for each of the requests, the rate limiter can receive the time information and determine whether to delay the request before providing it to one of multiple load balanced servers, provide the request without delay, or deny the request.

DETAILED DESCRIPTION

To handle a large amount of incoming traffic to a data center environment or other large collection of servers or other computing devices, embodiments provide for a distributed rate limiting mechanism that can be applied to the incoming traffic, which in various embodiments can be web serving requests for a given http service or requests seeking access to the same resource such as from proxy servers to an object server, e.g., a put request to a database such as a container. By providing this rate limiting mechanism, incoming requests from clients can be slowed down in a manner that is generally not visible to the user, and can be done in a highly distributed fashion with minimal overhead. In general, the technique may be realized by determining whether an incoming request is subject to rate limiting, and if so determining whether the request should be rate limited. If it is determined that the request should be rate limited, it can be delayed, e.g., in a middleware component, before it is provided to a server, e.g., a web server for handling.

In general, incoming requests from a network can be provided to middleware, which can be provided on a set of distributed systems, before being passed along to a given server for handling (or which can be distributed across the handling servers themselves). To provide for a desired quality of service for requests of different clients and/or request types, potentially having different priorities, the middleware can determine whether rate limiting is to be applied and if so, to handle the rate limiting before passing the request along to the indicated server.

In various embodiments, the distributed rate limiting can be performed in a client friendly manner, as requests are placed in a sleep state, e.g., using an event-driven, non-blocking framework the rate limiting mechanism acts as a filter on a process to slow the requests down, rather than returning an error or otherwise not handling the requests. In addition, embodiments can provide for high flexibility, as different canonical tokens can be generated for different classes of requests per user that can be individually rate limited. Furthermore, embodiments can be performed with minimal overhead, as a single back end request can be made per request to a key value store service, as will be discussed below. Embodiments further provide for horizontal scalability, as consistent hashing of the canonical tokens can be performed to distribute requests to multiple back end key value stores. Embodiments can be distributed such that consistent rate limiting can be maintained over multiple load balanced servers. Furthermore, embodiments can be configurable to allow rates to adjust, e.g., selectively increase or decrease, in a linear or other manner based on business rules according to a configuration selected.

Figure 1:
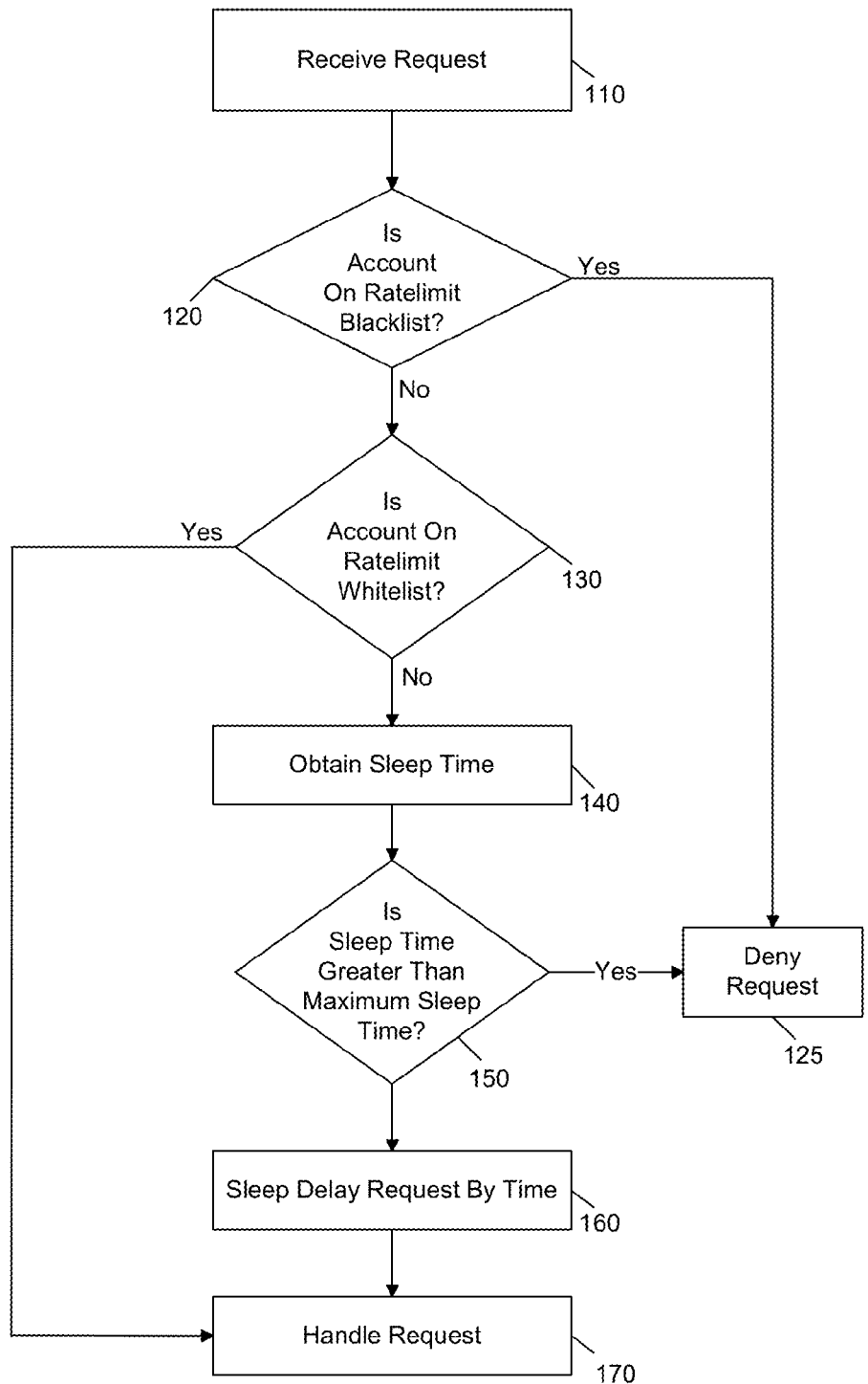
FIG. 1 is a flow diagram of a method in accordance with an embodiment of the present invention.

Referring now to FIG. 1, shown is a flow diagram of a method in accordance with an embodiment of the present invention. As shown in FIG. 1, method 100 can be performed by rate limiting logic within a data center, such as middleware that can be implemented in various locations. For example, the middleware may be distributed on a plurality of servers behind a load balancer, router or other location. As seen, method 100 can begin by receiving an incoming request (block 110). This incoming request can be associated with a given customer of the data center and can include various information. For example, the request can indicate the customer, e.g., by account number, type of request, such as a web serving request or so forth, among other such information, such as customer name, header information, URL, and so forth.

From this information, it can be determined whether the account is on a rate limit blacklist (diamond 120). This blacklist may be a list of accounts for which requests are to be prevented from being handled, e.g., due to excessive usage of resources, lack of payment, or for any other reason. If the request is associated with an account on a blacklist, control passes to block 125 where the request can be denied. Accordingly, no further processing occurs with regard to this request, and the request goes unfulfilled. In some embodiments, a notice of denial can be sent to the requester, e.g., a 497 response code is returned.

If instead it is determined that the account is not on the rate limit blacklist, control then passes to diamond 140 to determine whether the account is on a rate limit whitelist. This whitelist may be a list of accounts, sub-accounts or other collection of identifiers to indicate that rate limiting does not apply for a given set of requests. As one example, this can be based on account, where an account that does not have a premium status can be subject to rate limiting, while accounts of a given premium status may not be subject to rate limiting. Accordingly, if the account is not on a rate limit whitelist, control passes to block 170 where the request can be directly handled. In the example of FIG. 1, where middleware performs the operations shown, this handling of the request can simply be to pass the request off to a process running on the same load balanced server to handle the request according to the given request type. By providing the rate limiting mechanism on the same servers that handle the requests, horizontal scaling can be efficiently realized by adding more servers, such that the rate limiting mechanism scales along with them.

If instead at diamond 130 it is determined that the account is not on the rate limit whitelist, control passes to block 140 where a sleep time can be obtained. In one embodiment the middleware can perform various calculations to determine a sleep time for a given request, and which can be based on information received from a key value store service, discussed further below. To this end, the rate limiting logic can generate a token using attribute information of the request. This token can be used to access a ring that is distributed across the rate limit middleware to identify the appropriate key value store to access. In general, using this token, a given key value store is accessed to reference a counter in the key value store associated with the request. More specifically, the rate limiter sends an increment call to the key value store for this token and receives a new value of the counter. The key value store thus stores a number that is referenced/incremented/decremented via the token. Note that the sleep time obtained at block 140 can be zero, meaning that no delay of the request is needed, as will be discussed. After obtaining this sleep time, control passes to diamond 150 where it can be determined whether the sleep time obtained is greater than a maximum sleep time. This determination at diamond 150 can thus be based on a configured maximum sleep time. In various embodiments, a maximum sleep time can be associated with each account, or a global maximum sleep time can be set for a system. If it is determined that the sleep time is greater than the maximum sleep time, control passes to block 125 where the request can be denied.

Still with reference to FIG. 1, at block 160 a request can be delayed according to the obtained sleep time. For the case where the sleep time interval is zero, no delay thus occurs. Note that the delay does not cost anything, meaning that it does not tie up resources on the server to sleep on the request. In one embodiment, the server can place the request on hold using event-driven, non-blocking framework (by storing the request into an event queue) for a given amount of time and then continue to handle other work. After the specified amount of time has passed, the event is popped off the queue and continues to process in the same state that it left. As such, the process that handled the original request is not spinning idle for the duration of the sleep time. At the conclusion of the delay, which can be determined by expiration of a timer set to the length of the sleep time, control passes to block 170 where the request can be handled. Although shown with this particular implementation in FIG. 1, understand the scope of the present invention is not limited in this regard.

Figure 2:
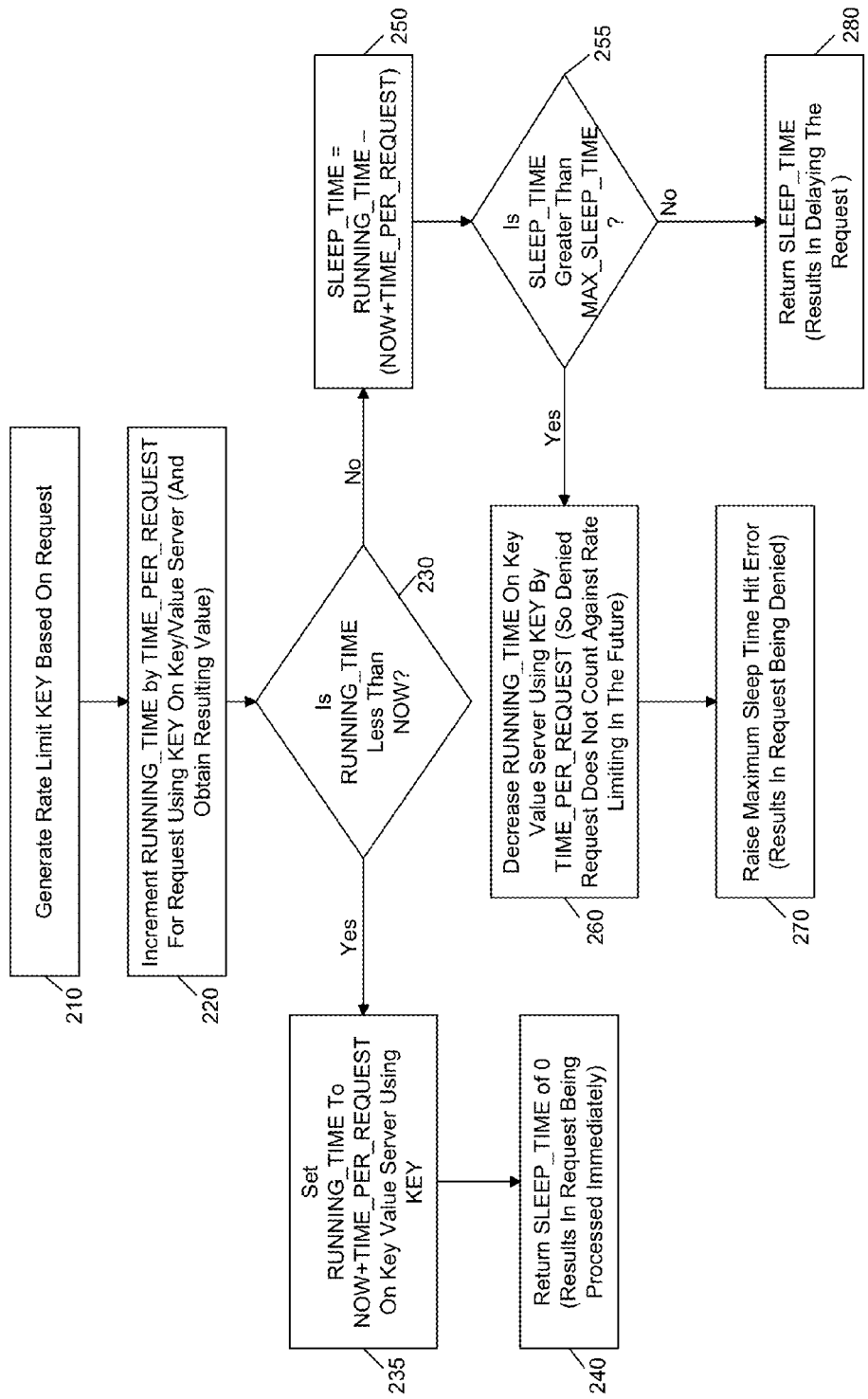
FIG. 2 is a flow diagram of a method for determining an amount of sleep time to delay an incoming request in accordance with an embodiment of the present invention.

Referring now to FIG. 2, shown is a flow diagram of a method for determining an amount of sleep time to delay an incoming request in accordance with an embodiment of the present invention. In one embodiment, method 200 can be performed at least in part by the same logic or middleware as discussed above with regard to the method of FIG. 1. As seen, method 200 may begin by generating a rate limit key that is based on the request (block 210). This rate key generation can per a given hash algorithm using attribute information of the request. Thus incoming requests of a given customer of the same type can cause generation of a consistent key or hash value and which is used to access a ring on the server to determine the appropriate key value store, so that the same entry of a key value store can be accessed to obtain information used to determine a sleep time. Next, control passes to block 220 where a running time value can be incremented by an amount corresponding to a time allotted per request. The running time value can be an indication of the time at which the request is to be performed. This time per request can be based itself on the key in that different keys can have different allotted times. Thus at block 220, an updated running time can be obtained. Note that this increment function can be performed in the key value store itself, in some embodiments.

Control then passes to diamond 230 where it can be determined whether the running time is less than the current time (NOW). This current time can be obtained, e.g., from a clock cycle counter for the system. In many embodiments, a uniform (synchronized) clock can be present on all the servers, and the current time can be obtained via a system call. If the running time is less than the current time, control passes to block 235 where the running time can be updated. More specifically, the running time can be set to the current time plus the time per request for the given key type. Again, this set function can be performed in the key value store itself, in some embodiments. This operation thus updates the running time to obtain a value that reflects the current time. Control then passes to block 240 where a sleep time of zero can be returned. More specifically, this sleep time can be returned back to the processing loop shown in FIG. 1. Because there is no sleep time, the incoming request can be handled immediately, without any delay associated with the rate limiting.

Still referring to FIG. 2, if instead it is determined that the current system time is greater than the running time value, control passes to block 250 where the sleep time can be determined. In the embodiment of FIG. 2, this sleep time determination can be in accordance with the following: Sleep Time=Running Time−(Current Time Value+Allotted Time Per Request).

Control next passes to diamond 255 where it can be determined whether the calculated sleep time is greater than a maximum sleep time. This maximum sleep time can be a value that sets a limit on a sleep time such that if the calculated sleep time is greater than this value, the request is simply not handled. As with the allotted time per request variable, the maximum sleep time can be set per account or per type of request, or a global maximum sleep time can be set for the system. As seen, if the sleep time is not greater than the maximum sleep time, control passes to block 280 where the sleep time can be returned. As this sleep time value is thus greater than zero, a delay period occurs prior to the handling of the request. For example, a delay timer can be set for this sleep time and at the conclusion of the delay timer, the request can be handled by the server.

Still referring to FIG. 2, if instead at diamond 255 it is determined that the sleep time value is greater than the maximum sleep time, control passes to block 260. There, the running time value can be updated. More specifically, in one embodiment the running time can be decremented by the amount of the time allotted per request. In this way, the denied request does not count against rate limiting in the future. This decrement function can be performed in the key value store itself, in some embodiments. From block 260, control passes to block 270 where an error signal can be returned. More specifically, a maximum sleep time hit error can be sent which results in the request being denied. Although shown with this particular implementation in the embodiment of FIG. 2, understand the scope of the present invention is not limited in this regard.

Figure 3:
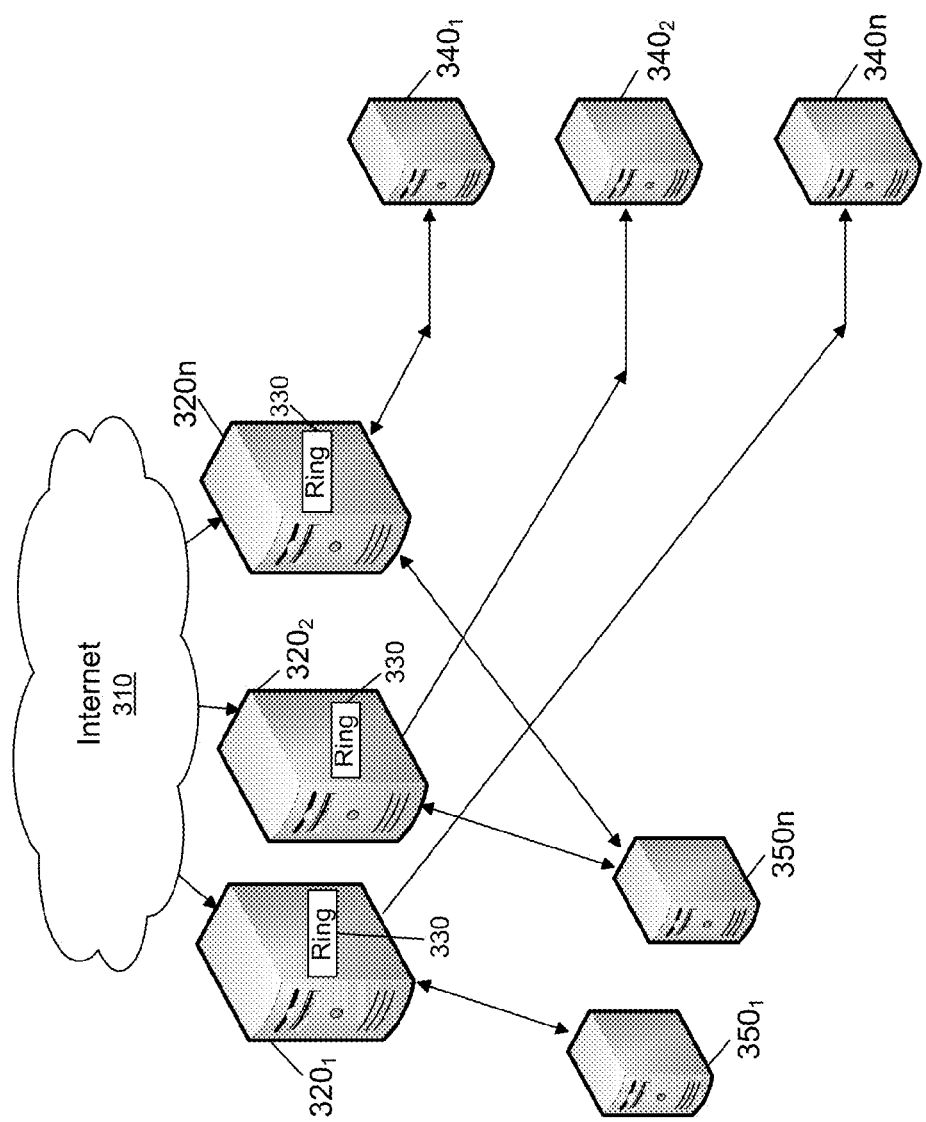
FIG. 3 is a block diagram of a portion of a data center environment in accordance with an embodiment of the present invention.

Referring now to FIG. 3, shown is a block diagram of a portion of a data center environment in accordance with an embodiment of the present invention, which can be located in a common facility. The data center may be a single tenant environment or more typically, may be a multi-tenant environment. That is, the data center may house servers and other computing devices associated with multiple customers of the data center. As shown in FIG. 3, environment 300 can be used to perform rate limiting in accordance with an embodiment of the present invention. Incoming requests, e.g., issued from users at remote locations, can be provided via the Internet 310 to a collection of middleware servers $320_1$-$320_n$. In one embodiment, such middleware servers can be configured to perform distributed rate limiting in accordance with an embodiment of the present invention. Based on information of the request, e.g., account information, a middleware server receiving the request can use a consistent hash ring 330 that is distributed across these middleware servers to determine the appropriate one of multiple key value servers $340_1$-$340_n$ that acts as a collection of key value stores used as a backend store. More specifically, a hash or key can be generated using the attribute information via a hash function. The resulting hash or key is then used to access consistent hash ring 330 to determine the appropriate key value store 340 that includes a storage element for the generated key.

In one embodiment, actions performed by the key value stores are SET, INCREMENT and DECREMENT functions with regard to a running time value corresponding to the current (new) value in the store. Note that the key value store provides atomic increment and decrement functions to the running time variable, which return the resultant value. In the embodiment shown, multiple key value servers are thus provided, each of which can store a plurality of key values, each associated with a given account and/or request type and corresponding information. The information stored per key value may be a running time, which as seen above is used to determine a sleep time, and an allotted time per request. In some embodiments, based on this information, an appropriate key value server 340 can providing the running time and report it back to the corresponding middleware server 320, which can generate a sleep time using this information. In turn, the middleware server may directly issue the request to one of a plurality of handling servers $350_1$-$350_n$ if no sleep time is indicated, delay the request for the indicated sleep time and then forward along to the handling server, or return an error to the requester if the sleep time is greater than a maximum configured sleep time.

These handling servers may be provided to perform workloads, house information, perform web serving and so forth. In some embodiments, these servers can be dedicated physical machines associated with a given customer that can be implemented as rack-mounted servers, as an example, or in certain embodiments at least some of the servers can be cloud servers. Of course other components such as network devices, e.g., firewalls, switches, load balancers, routers or so forth can be present in the data center. For example, servers 320 can in turn be coupled to one or more load balancers coupled to firewalls that in turn can be coupled to Internet 310 so that communications from external entities can be communicated to the handling servers and vice versa. Further note that in some embodiments, such firewalls can in turn be coupled to various layers of routers such as one or more routing layer routers and one or more aggregate switching layer routers before interconnection to the Internet. Although shown with this particular implementation in the embodiment of FIG. 3, understand the scope of the present invention is not limited in this regard.

Thus in general, when a client request comes in to one of servers 320, the request is checked to see if it is subject to possible rate limiting, e.g., with reference to white/blacklisted requests. If so, a token or key is generated based on the request's attributes. Assuming more than one key value server 340 is present, consistent hashing is used to determine which one is to be used, based on the generated token. This allows for different classes of requests to be rate limited differently and for the key value servers to be horizontally scalable.

Table 1 below shows example rate limiting pseudo code in accordance with an embodiment of the present invention. In general, this code is performed based on a configured rate for handling a request (max_rate in the pseudo code). If 100 requests per second are allowed, 10 milliseconds is allowed per request. Thus in this example an INCREMENT request of 10 is made to the corresponding key value store server, which returns the result of the function. If the value returned is greater than the current system time (unix_now_ms in the pseudo code), the server delays handling the request until that time. If the value is less than the current time (minus a short CATCH_UP_WINDOW, described below), a SET request is made to the key value store server with the current time. Otherwise, the request is handled immediately.

If the value returned would cause the request to be delayed for an excessive amount of time corresponding to a maximum sleep time (e.g., 60 seconds by default) an error is returned to the client.

Note that CATCH_UP_WINDOW allows for the server to catch up. That is, if client requests slow below the limit specified and then speed up again, the rate is allowed to burst above the configured limit so that the average rate is maintained. Note that this window can be adjusted according to system needs. For example to prevent the rate from increasing over the amount specified, the window can be set to 0. In one embodiment, a window of 5 seconds allows for a very consistent rate from a client's point of view.

TABLE 1

```
function get_sleep_time (token, max_rate):
    ```
    Returns the amount of time (a float in seconds) that the a request should sleep.
    ```
    # ms stands for milliseconds
    unix_now_ms = int(round(time.time)*1000))
    allotted_per_request_ms = int(round(1000/max_rate))
    running_time_ms = key_value_store_service_client.increment (token,
                                                    allotted_request_ms)
    need_to_sleep_ms = 0
    if running_time_ms < (unix_now_ms − CATCH_UP_WINDOW):
        key_value_store_service_client.set (token, unix_now_ms + allotted_per_request_ms)
    else:
            need_to_sleep_ms = running_time_ms − unix_now_ms − allotted_per_request_ms
    if need_to_sleep_ms > MAX_SLEEP_TIME:
        key_value_store_service_client.decrement (token, allotted_per_request_ms)
        raise MaxSleepTimeHitError ("MaxSleepTimeExceeded")
    return need_to_sleep_ms / 1000
function handle_ratelimit (request):
    ```
    Performs rate limiting and account white/black listing. Sleeps
    If necessary. Returns a Response object on failure.
    ```
    if blacklist_request(request):
        return Response (status='497 Blacklisted',
            body='Your account has been blacklisted', request=req)
    if whitelist_request(request):
        return
    for token, max_rate in generate_tokens_and_rate(req):
        try:
            need_to_sleep_seconds = get_sleep_time(token, max_rate)
            if need_to_sleep_seconds > 0:
                sleep (need_to_sleep_seconds)
        except MaxSleepTimeHitError:
            return Response {status='498 Rate Limited',
                    body='Slow down', request=request)
        return
```

Referring now to Table 2, shown is an example of handling multiple incoming requests received by a rate limiter in accordance with an embodiment of the present invention. Assume for purposes of discussion that an initial current system time is at 100 and handling servers are configured to handle 2 requests per second. For the discussion, assume that 5 concurrent threads, namely threads A-E, send requests to be handled. Assume that requests, once scheduled can be handled instantaneously. As seen, the 5 threads all provide their requests at the same time, namely at the initial time of 100. A first one of these requests can be handled at that time, without a sleep period. Instead, the remaining 4 concurrent requests can be handled at a conclusion of a given sleep time, which as seen can vary accordingly. By providing rate limiting as disclosed herein and shown for example in Table 2, all the incoming requests can be handled in a timely manner, without failing any of the requests, and without overburdening resources allocated to a customer.

Embodiments may be implemented in code and may be stored on a storage medium having stored thereon instructions which can be used to program a system to perform the instructions. The storage medium may include, but is not limited to, any type of non-transitory storage medium suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

receiving a request in a rate limiter of a multi-tenant data center, the request received from a remote user associated with an account of a customer of the multi-tenant data center, the request for an operation to be performed by a handling server of the multi-tenant data center, the

TABLE 2

| Time | 100 | 100 | 100 | 100 | 100 | 100 | 100.5 | 101 | 101.5 |
|---|---|---|---|---|---|---|---|---|---|
| Thread names sending request | a | B | c | d | e | a | b | c | d |
| Time request received | 100 | 100 | 100 | 100 | 100 | 100 | 100.5 | 101 | 101.5 |
| Time request will be handled (Counter Value) | not set | 100.5 | 101 | 101.5 | 102 | 102.5 | 103 | 103.5 | 104 |
| Sleep time | 0 | 0.5 | 1 | 1.5 | 2 | 2.5 | 2.5 | 2.5 | 2.5 | rate limiter distributed across a plurality of horizontally scalable servers of the multi-tenant data center;

responsive to determining that the account is on a white list, forwarding the request from the rate limiter to the handling server without a delay;

responsive to determining that the account is not on the white list, obtaining a sleep time for the request based at least in part on a first time value and an allotted time per request corresponding to a configured rate for handling the request, the first time value to be obtained from one of a plurality of key stores accessed via a rate limit key generated based on the request and used to access a consistent hash ring to determine the one of the plurality of key stores, and delaying the request according to the sleep time and thereafter forwarding the request from the rate limiter to the handling server; and storing a plurality of entries in the plurality of key stores each storing a key and a running time associated with the key, wherein each of the keys is generated based on an attribute of an incoming request, and issuing an atomic increment to update the running time of an entry of the key store accessed via the rate limit key, and receiving the running time to determine the sleep time; and wherein the key store is distributed across a plurality of key value servers, and a plurality of incoming requests of the account of a first request type are to cause generation of a common key, the common key to access a consistent hash ring on the plurality of handling servers to determine one of the plurality of key value servers, the common key to access the same entry of the determined key value server to obtain the running time.

2. The method of claim 1, further comprising determining if the account is on a blacklist, and if so not handling the request.

3. The method of claim 1, further comprising determining if the sleep time is greater than a maximum sleep time, and if so not handling the request.

4. The method of claim 1, wherein obtaining the sleep time comprises:

calculating the sleep time based on a difference between the first time value and a sum of a current time and the allotted time.

5. The method of claim 4, further comprising accessing a key storage of the one of the plurality of key stores using the rate limit key to obtain the first time value.

6. The method of claim 4, further comprising if the first time value is less than the current time, not delaying the request before forwarding the request to the handling server.

7. The method of claim 4, further comprising if the first time value is less than the current time, updating the first time value using the current time and the allotted time.

8. The method of claim 4, further comprising if the sleep time is greater than a maximum sleep time, updating the first time value using the allotted time.

9. The method of claim 1, further comprising executing the rate limiter in a distributed manner across a plurality of handling servers.

10. A system comprising:

a router hardware to receive incoming requests from a network;

a load balancer hardware coupled to the router hardware to receive at least some of the incoming requests and provide the at least some incoming requests to a plurality of servers each having a synchronized clock;

a memory to store instructions;

a processor to execute the instructions including a rate limiter to determine whether a first account associated with an incoming request is on a white list, and if so forward the incoming request from the rate limiter to one of the plurality of servers without a delay and if not, to delay the incoming request associated with the first account and obtain a sleep time for the incoming request based at least in part on a first time value and an allotted time per request corresponding to a configured rate for handling the incoming request, the first time value to be obtained from one of a plurality of key value servers accessed via a rate limit key, the incoming request to be delayed by the sleep time if a rate of the incoming requests exceeds a handling rate associated with the first account; and a key store to store a plurality of entries each storing a key and a running time associated with the key, wherein each of the keys is based on an attribute of an incoming request, and the rate limiter is to issue an atomic increment to update the running time of an entry of the key store accessed via a key generated from the incoming request attribute, and receive the running time to determine the sleep time, wherein the rate limiter is distributed across the plurality of servers, the key store is distributed across the plurality of key value servers, and a plurality of incoming requests of the first account of a first request type are to cause generation of a common key, the common key to access a consistent hash ring on the plurality of servers to determine one of the plurality of key value servers, the common key to access the same entry of the determined key value server to obtain the running time.

11. The system of claim 10, wherein the rate limiter is to delay a first request for a first delay time period, the first delay time period calculated according to a difference between the running time and a sum of a current system time and an allotted time per request for the first account.

12. The system of claim 11, wherein the delay is transparent to a requester and comprises placing the first request in an event queue of one of the plurality of servers for the first time delay period, the server an event-based server.

* * * * *

UNITED STATES PATENT AND TRADEMARK OFFICE
CERTIFICATE OF CORRECTION

| | | |
|---|---|---|
| PATENT NO. | : 8,930,489 B2 | Page 1 of 1 |
| APPLICATION NO. | : 13/270380 | |
| DATED | : January 6, 2015 | |
| INVENTOR(S) | : Goetz et al. | |

It is certified that error appears in the above-identified patent and that said Letters Patent is hereby corrected as shown below:

On the title page item [73], "Rakspace US, Inc." should be --Rackspace US, Inc.--

Signed and Sealed this
Twenty-second Day of March, 2016

Michelle K. Lee
*Director of the United States Patent and Trademark Office*